Figure 1:
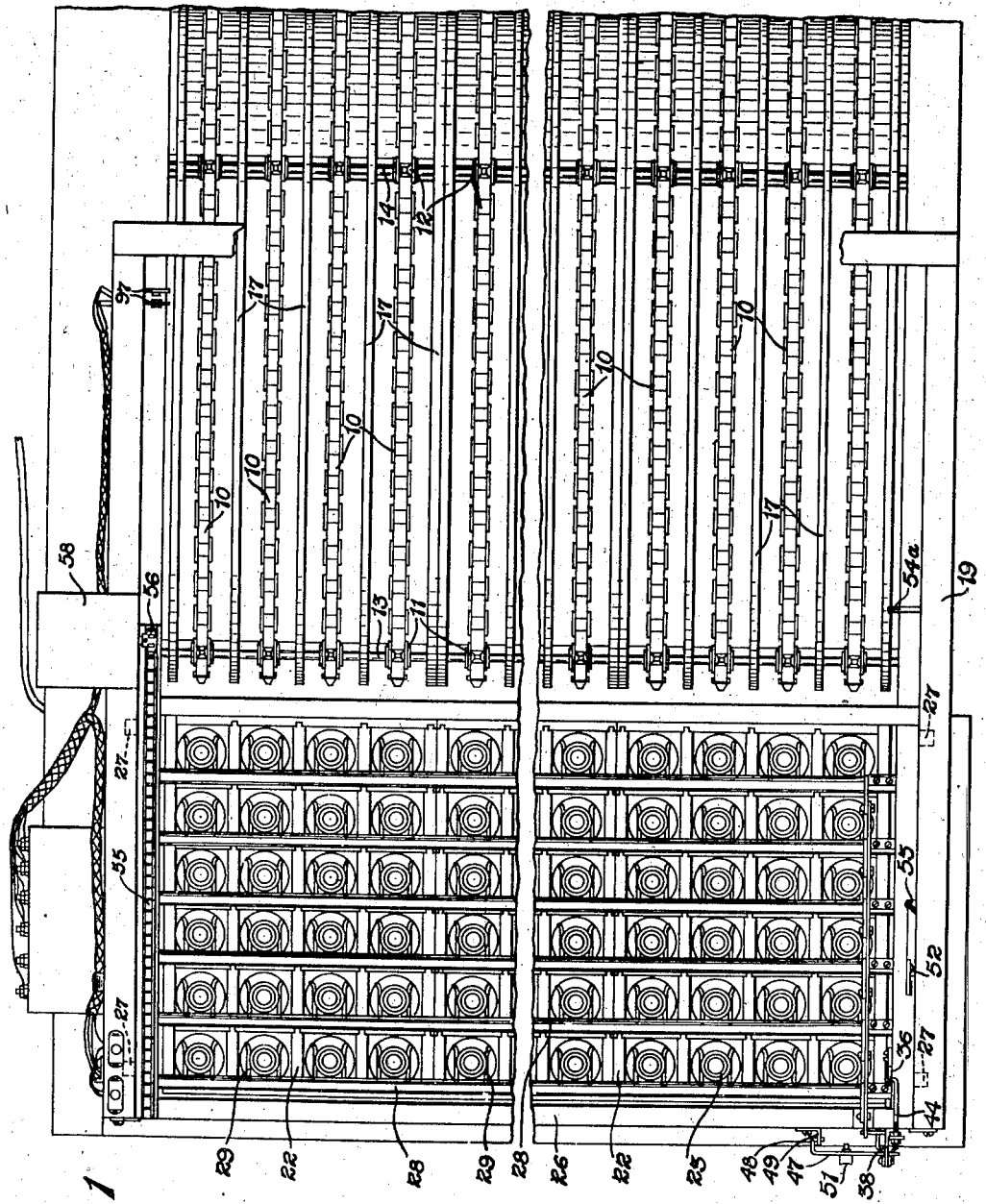

Nov. 2, 1948.  R. F. HAMMEN  2,452,927
BOTTLE HANDLING APPARATUS
Filed Feb. 18, 1946  5 Sheets-Sheet 4

Inventor
Russell F. Hammen
By Frease and Bishop
Attorneys

Nov. 2, 1948.    R. F. HAMMEN    2,452,927
BOTTLE HANDLING APPARATUS
Filed Feb. 18, 1946    5 Sheets-Sheet 5

Inventor
*Russell F. Hammen*

Patented Nov. 2, 1948

2,452,927

UNITED STATES PATENT OFFICE 2,452,927

BOTTLE HANDLING APPARATUS

Russell F. Hammen, Canton, Ohio

Application February 18, 1946, Serial No. 648,422

13 Claims. (Cl. 214—1.1)

The invention relates to apparatus for handling bottles and more particularly to mechanism for loading bottles into a bottle washing machine.

Bottling works and similar establishments are usually equipped with automatic bottle washing machines in which empty bottles returned by customers are washed before being refilled. Such bottle washing machines are provided, at the loading end, with a plurality of endless conveyors, separated by partition walls, each of which conveys a row of empty bottles in single file to the washing mechanism.

Under present practice the empty bottles are manually removed from the cases or crates and placed upon these endless conveyors which carry the bottles to the washing apparatus. This is an operation requiring considerable skill and experience, as the operator must work rapidly, accurately and continuously in order to convey the empty bottles uniformly to the machine on all of said endless conveyors so as to obtain the maximum efficiency of the bottle washing machine, which is essential in order to prevent slowing down of the bottling apparatus to which the washed and sterile bottles are usually automatically discharged from the washing machine.

It is an object of the present invention to provide an apparatus for automatically loading empty bottles into such a bottle washing machine.

Another object is to provide a bottle handling apparatus which will automatically remove the bottles from the cases or crates and deposit them uniformly upon the endless conveyors at the loading end of the bottle washing machine.

A further object is to provide such apparatus in which it is only necessary for the operator to place the filled cases of bottles in the apparatus and remove the empty cases therefrom.

A still further object is to provide a bottle handling apparatus of the character referred to in which the cases loaded with empty bottles, are placed in the machine and raised to a point where the bottles are individually engaged by longitudinally movable mechanism, the cases being then lowered and the bottles carried forward by said movable mechanism and deposited upon the endless conveyors at the loading end of the bottle washing machine, the empty cases being removed from the apparatus and replaced by filled cases during this operation.

Still another object of the invention is to provide a bottle handling apparatus of this type in which a vertically movable elevator, in the form of a cylinder operated plunger, or the like, is provided for raising and lowering the bottle cases or crates at the charging end of the machine.

Another object is to provide such a bottle handling machine in which a plurality of pairs of hooks or fingers are pivotally mounted in a horizontally movable, automatically reversible frame, for removing the bottles from the cases and carrying them forward and depositing them upon the endless conveyors of the bottle washing machine.

A further object is to provide a bottle handling machine with such a longitudinally movable frame and with means for automatically tripping the pivoted hooks or fingers at each end of the travel of said frame.

Figure 2:
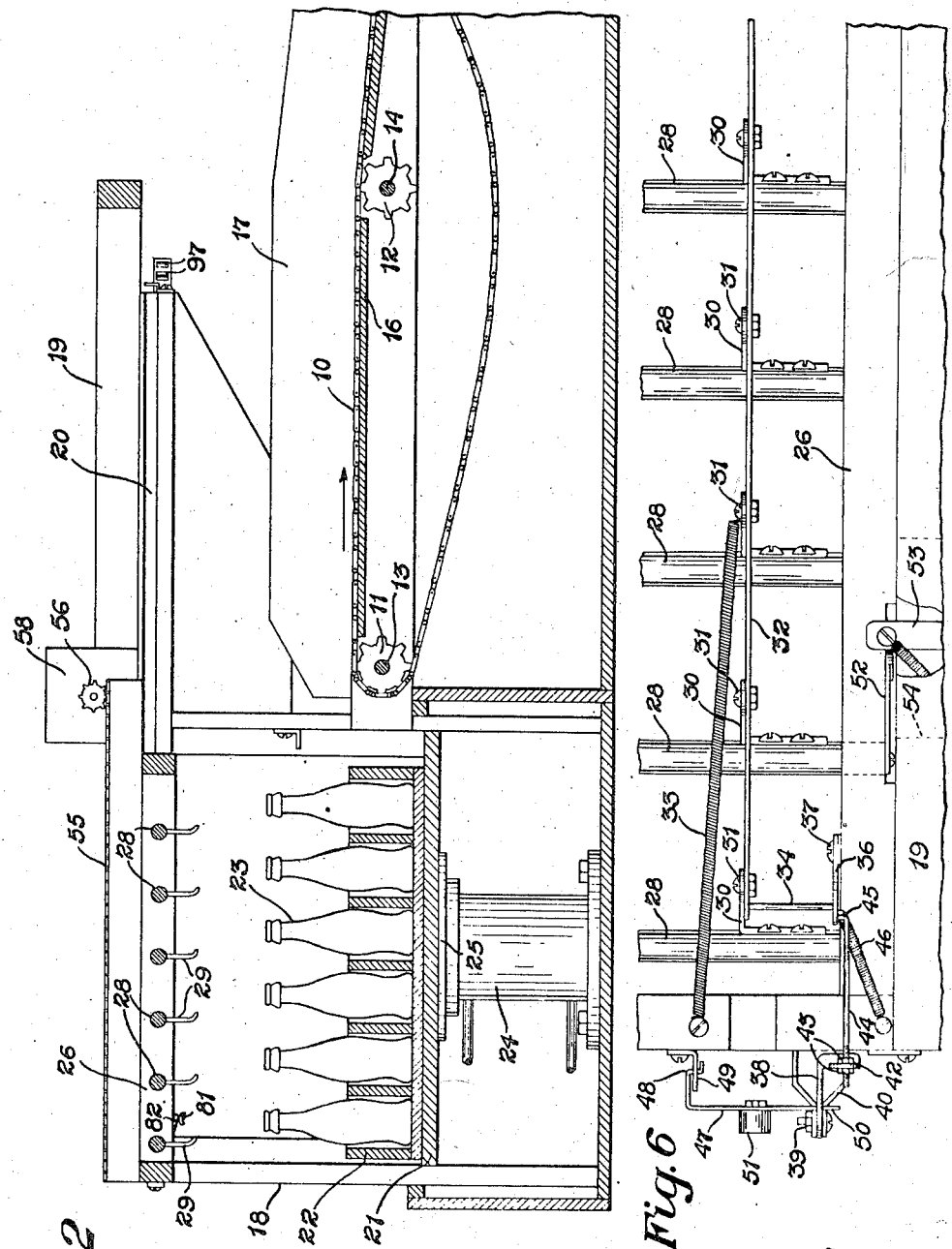
Figure 3:
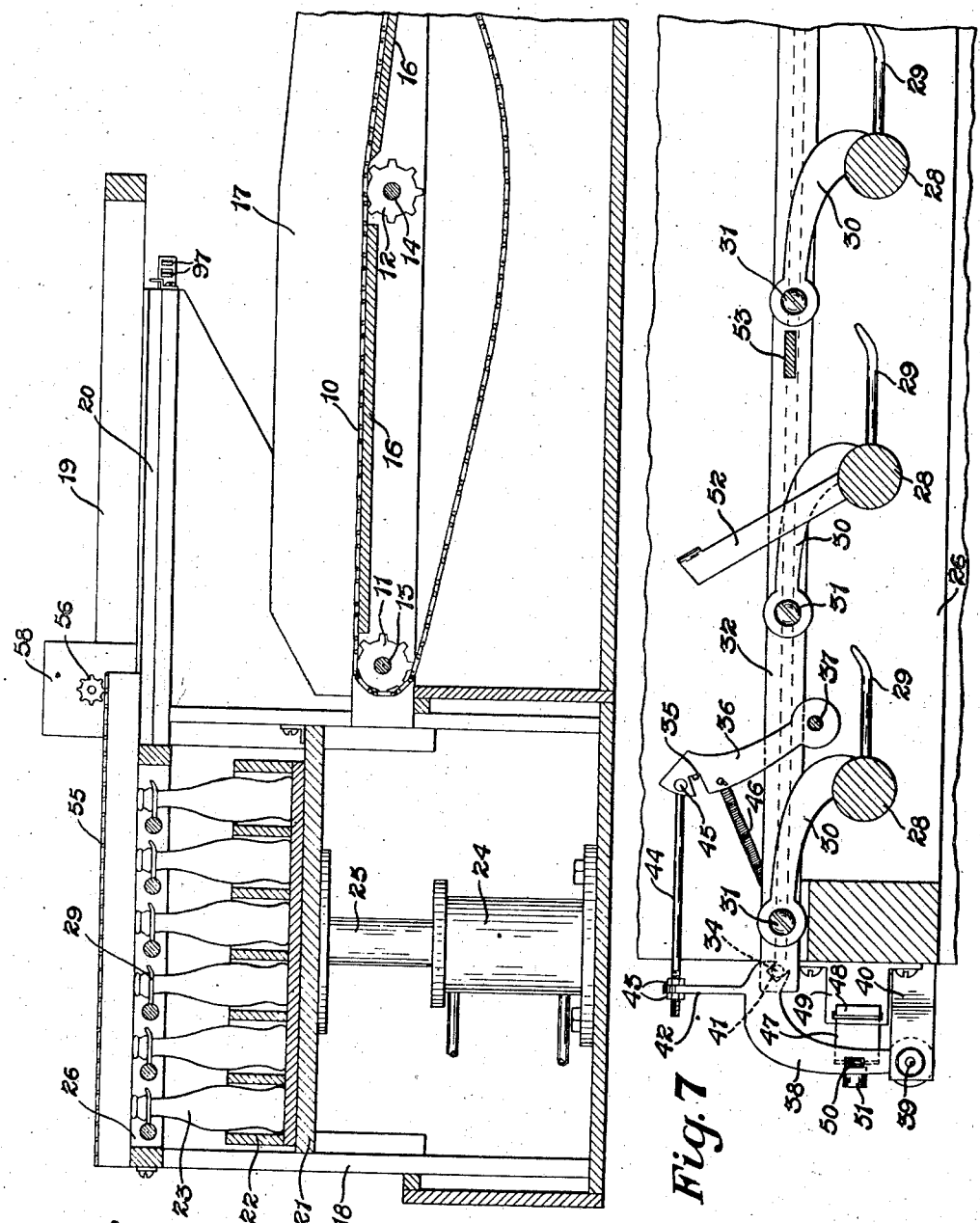
Figures 4, 8:
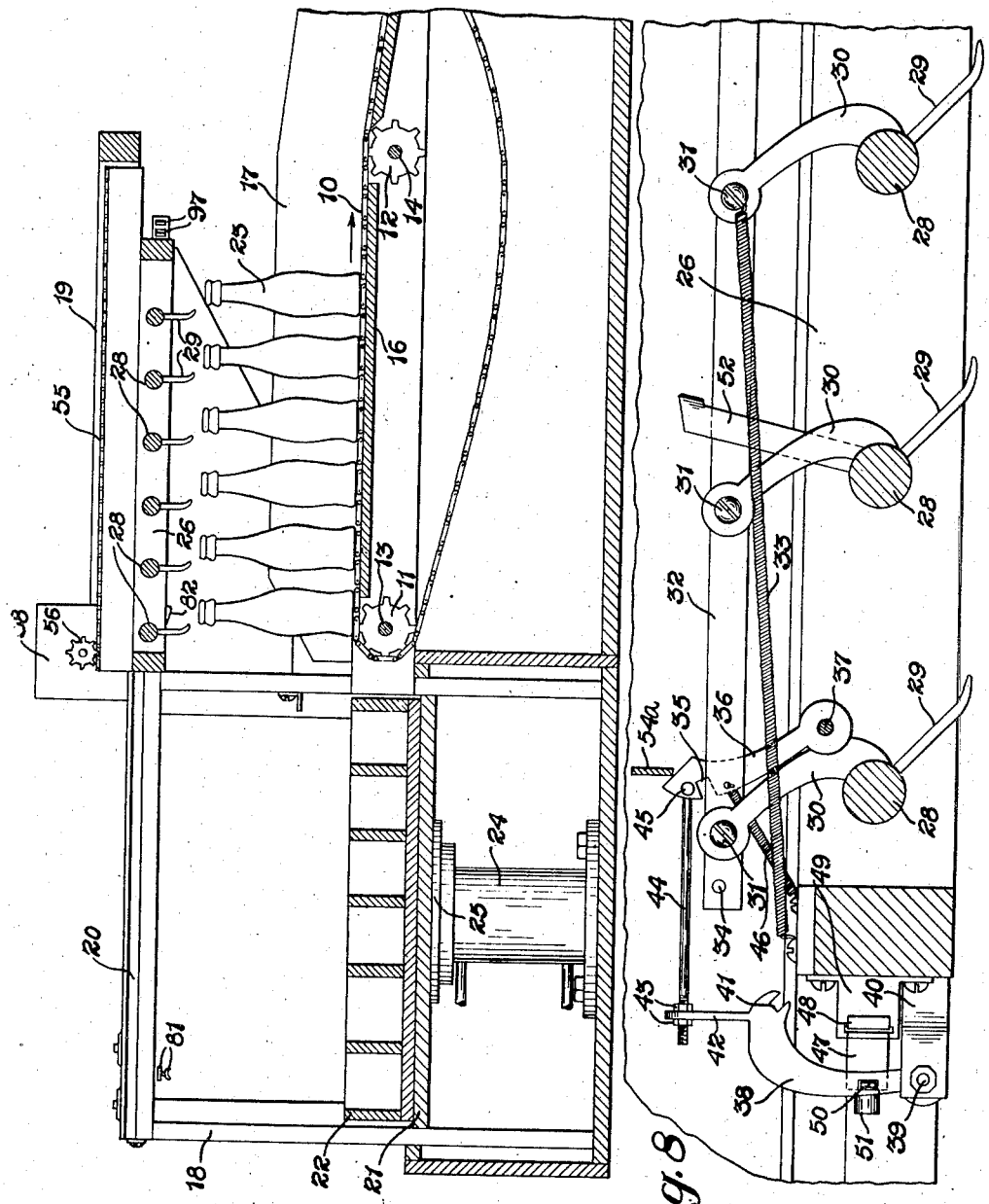
Figure 5:
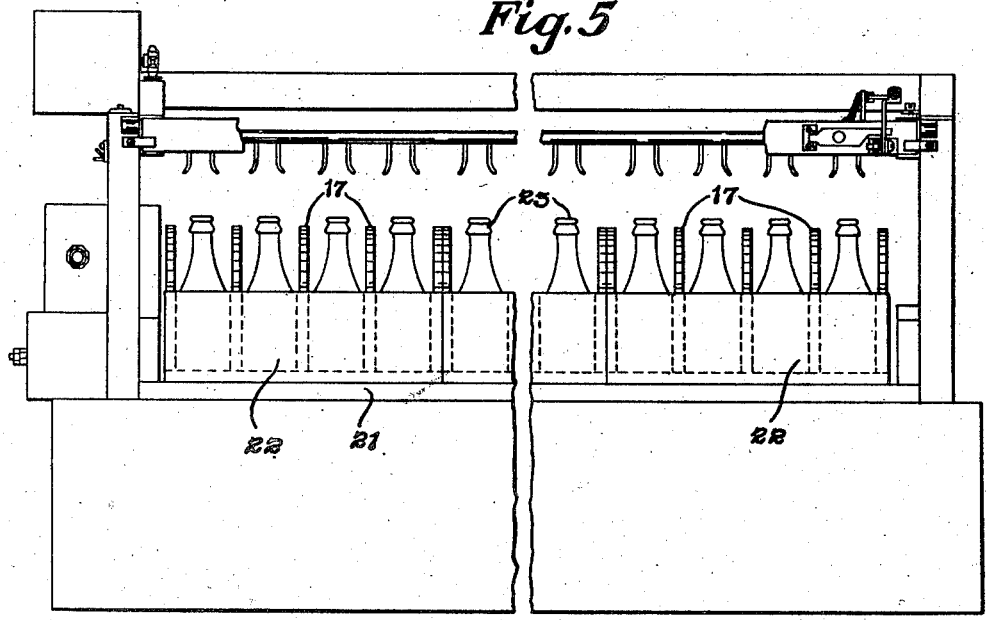
Figure 9:
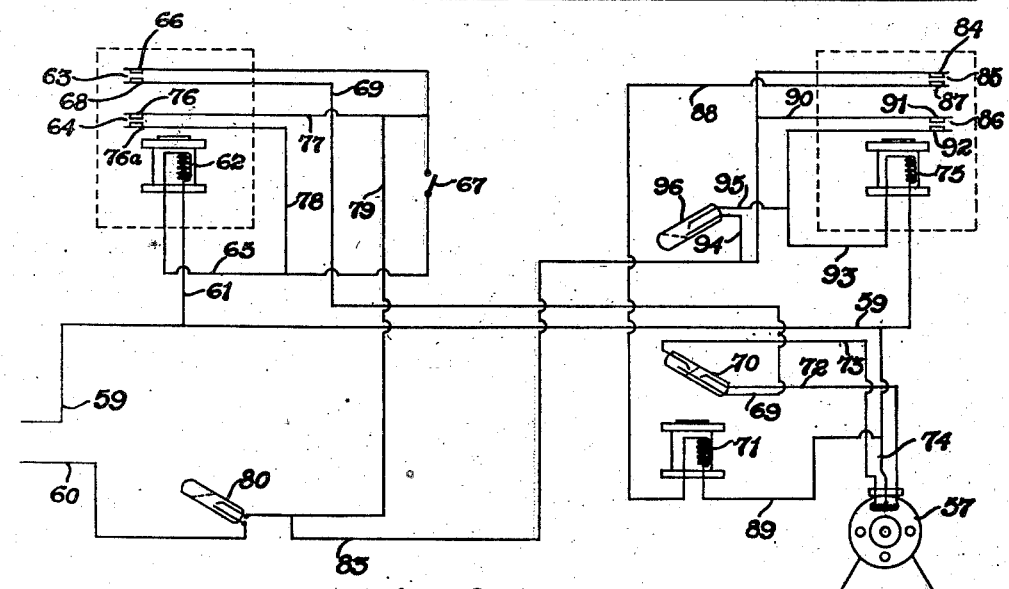

The above objects, together with others which will be apparent from the drawings and following description, or which may be later referred to, may be attained by constructing the bottle handling apparatus in the manner of the embodiment thereof hereinafter described in detail and illustrated in the accompanying drawings, in which;

Figure 1 is a top plan view of a bottle handling apparatus embodying the invention, showing the machine in the position when the bottles have just been engaged by the pivoted hooks or fingers of the longitudinally movable frame, in the charging stage;

Fig. 2 a vertical, longitudinal section through the machine in the initial position with a case of bottles upon the elevator prior to being raised;

Fig. 3 a view similar to Fig. 2, showing the case of bottles in the raised position and the pivoted hooks or fingers of the movable frame engaging the bottles;

Fig. 4 a view similar to Figs. 2 and 3, showing the case elevator in lowered position and the movable frame at the forward limit of its travel, the bottles having just been deposited upon the endless conveyors of the bottle washing machine;

Fig. 5 a front elevation of the machine in the initial position;

Fig. 6 an enlarged, top plan view of the tripping mechanism which operates the pivoted hooks or fingers, showing the same in the initial position;

Fig. 7 an enlarged, vertical, longitudinal sectional view of the tripping mechanism and some of the pivoted hooks or fingers showing the same in the operated position;

Fig. 8 a view similar to Fig. 7, showing the mechanism at the instant of tripping to deposit the bottles upon the endless conveyors, and;

Fig. 9 a diagrammatic view of an electric circuit which may be employed for automatically operating the apparatus.

The charging or loading end portion of a conventional bottle washing machine is indicated in the drawings as including a plurality of similar, parallel endless conveyors which are preferably in the form of a special type of chain commonly known as block chains and indicated at 10 running over sprockets wheels 11 and 12 mounted upon shafts 13 and 14 and driven in the direction of the arrows, by any usual means, not shown, for continuously conveying rows of empty bottles into the washing mechanism of a conventional bottle washing machine.

These chains preferably drag over the top of a table or platform such as the horizontal table 16 shown in the drawings and the rows of empty bottles carried by individual chains may be separated from each other by partition walls 17 as is usual in ordinary practice in such bottle washing machines.

The improved bottle handling apparatus to which the invention pertains is in the form of a bottle loading machine which automatically unloads the empty bottles from the cases or crates in which they are returned to the bottling works or other establishment by the customers, and loads these empty bottles onto the endless conveyors at the charging or loading end of the bottle washing machine.

The bottle handling machine to which the invention pertains may be mounted in a frame, indicated generally at 18, located at the charging or loading end of the bottle washing machine and provided at its upper portion with a horizontal portion 19, having an extension overhanging the endless conveyors of the bottle washing machine and provided with horizontal rails or tracks 20 for a purpose to be later described.

The machine includes a vertically movable support or table 21 for receiving cases, indicated generally at 22, of empty bottles 23. Any suitable means may be provided for raising and lowering the table 21, and for the purpose of illustration a fluid cylinder 24 is shown provided with a plunger 25 connected to the under side of the table 21.

A longitudinally movable frame 26 is mounted for horizontal movement within the track 20 mounted on the upper portion of the frame 18 of the bottle handling machine, being provided at its sides with rollers 27 received within the tracks 20.

A plurality of equally spaced, transversely disposed shafts or rods 28 are journalled in the frame 26, these shafts or rods corresponding in spacing to the rows of bottles 23 in the case 22. Each of the shafts or rods 28 is provided with spaced pairs of curved fingers or hooks 29 corresponding in number and position to the empty bottles 23 in each case.

Tripping mechanism for controlling the operation of the rotatable shafts or rods 28 to move the fingers or hooks 29 thereon to raised or lowered position as desired, is provided at one side of the movable frame 26 and is shown in detail in Figs. 6, 7 and 8 of the drawings. This mechanism includes a rocker arm 30 fixed to each shaft or rod 28, the free ends of said rocker arms preferably connected, as at 31, to a horizontally disposed link 32.

A spring 33 is connected at one end as at one of the pivotal points 31 to the link 32 and at its other end to the movable frame 26 for normally urging the link 32 rearwardly or to the left as viewed in Figs. 6, 7 and 8, so as to normally urge the shafts 28 to position to move the hooks or fingers 29 thereon to the raised or horizontal bottle carrying position as indicated in Fig. 7.

A stud 34 is connected to the outer end of the link 32 and adapted to engage the notch 35 of the lever 36, pivoted as at 37 upon the adjacent side of the frame 26 to hold the hooks or fingers 29 in the vertical or inoperative position, as indicated in Fig. 6.

A lever 38 is pivoted as at 39 upon a bracket 40 mounted upon the outer end of the frame 26, said lever being provided with a notch 41 which receives the stud 34 to hold the fingers or hooks 29 in the raised or operative position as shown in Fig. 7.

The lever 38 may be provided with an extension 42 to which is rigidly connected, as by nuts 43, a rod 44, the free end of which is bent at an angle and pivotally connected to the lever 36, as indicated at 45.

A spring 46 is connected at one end to the lever 36 and at its other end to the frame 26 for normally urging notches 35 and 41 in the levers 36 and 38 respectively to the positions shown in Fig. 8.

An operating lever 47 may be fulcrumed as at 48 upon a bracket 49 mounted upon the outer end of the frame 26 and operatively connected to the lever 38 as indicated at 50, a button 51 being provided upon the lever 47 for manually operating the levers 36 and 38 to release the stud 34 from the notch 35 in the lever 36 and permit the spring 33 to pull the link 32 and through it the rocker shaft arms 30 and shafts 28 and fingers 29 to the position shown in Fig. 7, raising the hooks or fingers 29 to the operative position and engaging the stud 34 in the notch 41 of the lever 38 so as to hold the parts in this position when the weight of the bottles 23 are suspended on the fingers 29, as in Fig. 1.

A lever arm 52 is fixed upon one of the shafts 28 for engagement with the spring operated trip lever 53, mounted in a socket 54 in the adjacent side of the horizontal portion 19 of the frame of the machine. A rigid trip finger 54ᵃ is mounted upon the adjacent side of the stationary frame member 19 for engagement with the lever 36 as will be later described.

A rack bar 55 is fixed upon the sliding frame 26 and engages a pinion 56 upon the shaft of a reversing motor 57 which may be located in the housing 58 mounted upon the stationary upper portion 19 of the machine frame.

A suggested circuit for the motor 57 is shown diagrammatically in Fig. 9 in which the wires 59 and 60 lead from any suitable source of electric energy. A wire 61 connects the wire 59 with a solenoid 62 which operates the solenoid switches 63 and 64, said solenoid being connected by a wire 65 to one contact 66 of the switch 63, a starting switch 67 being provided in the wire 65 for closing the circuit to start the motor 57.

The other contact 68 of the switch 63 is connected by a wire 69 to a mercury switch 70. The mercury switch 70 is operated by a solenoid 71. A wire 72 leads from the same side of the mercury switch 70 as the wire 69 and connects to one side of the reversing motor 57. A wire 73 leads from the other side of the mercury switch 70 and connects to the other side of the reversing motor 57.

A third wire 74 leads from the reversing motor 57 and connects to the line wire 59 which line wire is connected to one side of a solenoid 75.

One contact 76 of the solenoid operated switch 64 is connected by a wire 77 to the wire 65 on one side of the starting switch 67 and the other contact 76a of said switch 64 is connected by a wire 78 to the wire 65 on the other side of the starting switch 67.

A wire 79 leads from the wire 77 to a mercury switch 80 which may be operated in any usual and well known manner by closing of the contacts 81 shown in Figs. 2 and 4, by movement of the frame 26 from the initial position, said contacts 81 being held open in the initial position of the frame 26 by means of the lug 82 upon said frame. The line wire 60 also connects to the mercury switch 80.

A wire 83 connects to the wire 79 and leads to one contact 84 of the solenoid operated switch 85 which together with the switch 86 is operated by the solenoid 75. The other contact 87 of the switch 85 is connected by a wire 88 with the solenoid 71 the other side of which is connected by a wire 89 with the wire 74 from the reversing motor 57.

A wire 90 connects the wire 83 with one contact 91 of the solenoid operated switch 86, the other contact 92 of said switch being connected by a wire 93 with the solenoid 75 which operates the switches 85 and 86.

Wires 94 and 95 connect the wires 83 and 93 with the mercury switch 96 which may be operated in any usual and well known manner through closing of the contacts 97, as shown in Figs. 1, 2, 3 and 4, by movement of the frame 26 as will be later described.

In the operation of the machine to charge empty bottles into the bottle washing machine, cases 22 of empty bottles 23 are placed upon the vertically movable table or support 21, in its lowered position, as shown in Figs. 2 and 5.

The fluid operated cylinder 24 is then operated to raise the cases of empty bottles and the button 51 upon the operating lever 47 is pressed to operate the trip mechanism to the position shown in Fig. 7, raising the hooks or fingers 29 to the horizontal position engaging the necks of the bottles 23, just below the enlarged upper ends thereof, as shown in Figs. 1 and 3.

The cylinder 24 is then operated to lower the table 21 and the empty cases 22 thereon leaving the bottles 23 suspended upon the hooks or fingers 29. The starting switch 67 is then closed operating the reversing motor 57 in a direction to move the frame 26 toward the position shown in Fig. 4 of the drawings, carrying the empty bottles 23 to a point above the conveyors 10.

Just as the frame 26 approaches the end of its movement in this direction, the lever 36 is engaged by the rigid stop finger 54a, as indicated in Fig. 8, sufficiently to release the stud 34 from the notch 35 in the lever 36 permitting the weight of the bottles upon the hooked fingers 29 to tilt said fingers downwardly as shown in Figs. 4 and 8, depositing the bottles 23 upon the conveyors 10 which carry them into the bottle washing machine.

The forward end of the movable frame 26 then engages the contacts 97 closing the same and reversing the motor 57, which through the pinion 56 and rack bar 55 moves the frame 26 back to the initial position.

As the lever 52 on one of the shafts 28 upon the frame 26 contacts the spring loaded trip finger 53 on the return movement, the trip mechanism is positively returned to the inoperative position shown in Figs. 2 and 6 with the fingers 29 in vertical position so that another case of bottles may be placed in the bottle handling machine and operated as above described.

As the frame 26 reaches the initial position, the contact points 81 are separated by means of the lug 82 upon the frame 26 breaking the circuit and stopping the motor 57.

When the starting switch 67 is manually closed the circuit is closed from the line wire 59 and wire 61 through the solenoid 62, wire 65, switch 67, wires 77 and 79, mercury switch 80 to the line wire 60. The solenoid 62 being thus energized operates the switches 63 and 64 to closed position.

The circuit is thus closed from the line wire 60, through the mercury switch 80, wires 79, 77 and 65, switch points 66 and 68 of the switch 63, wire 69, mercury switch 70, wire 72 to the motor 73, and wire 74 to the line wire 59, thus closing the line circuit to the motor 73 and operating it in a direction to move the frame forwardly. When the forward end of the frame has reached the point where it engages the contacts 97 to close the same the mercury switch 96 is tilted so as to close the circuit from the line wire 60, switch 80, wires 83 and 94, mercury switch 96, wires 95, 93, solenoid 75 to the line wire 59, energizing the solenoid 75 which closes the switches 85 and 86. The circuit will thus also be closed from the line wire 59, wires 74 and 89, solenoid 71, wire 88, contact points 84 and 87 of the switch 85, wire 83, switch 80 to the line wire 60, energizing the solenoid 71 which tilts the mercury switch 70 so as to break the contact between the wires 69 and 72 and make contact between the wires 69 and 73, reversing the motor 75 and moving the frame back to the starting point.

I claim:

1. Bottle handling apparatus for removing bottles from cases and depositing them in a bottle washing machine or the like, comprising in combination with a plurality of endless conveyors at the loading end of the bottle washing machine, a support for a case of bottles, means for raising said support with the case of bottles thereon, spaced pairs of normally depending rotatable fingers, means for rotating the fingers upwardly for engaging the bottles while the case is in raised position, means for lowering the case, means for transporting the bottles to a position above the endless conveyors, and means for rotating the fingers downwardly for depositing the bottles upon the endless conveyors when they reach said position.

2. Bottle handling apparatus for removing bottles from cases and depositing them in a bottle washing machine or the like, comprising in combination with a plurality of endless conveyors at the loading end of the bottle washing machine, a support for a case of bottles, means for raising said support with the case of bottles thereon, a horizontally movable frame spaced above the support, spaced pairs of normally depending rotatable fingers in the frame means for rotating the fingers upwardly for engaging the bottles while the case is in the raised position, means for lowering the case, means for horizontally moving the frame to position the bottles above the endless conveyors and means for rotating the fingers downwardly for relasing the bottles from the frame and depositing them upon the endless conveyors.

3. Bottle handling apparatus for removing bottles from cases and depositing them in a bottle washing machine or the like, comprising in combination with a plurality of endless conveyors at the loading end of the bottle washing machine, a support for a case of bottles, means for raising said support with the case of bottles thereon, a horizontally movable frame spaced above the support, spaced pairs of normally depending rotatable fingers in the frame means for rotating the fingers upwardly for engaging the bottles while the case is in the raised position, means for lowering the case, means for horizontally moving the frame to position the bottles above the endless conveyors and means for rotating the fingers downwardly for releasing the bottles from the frame and depositing them upon the endless conveyors, and means for moving the frame back to the initial position.

4. Bottle handling apparatus for removing bottles from cases and depositing them in a bottle washing machine or the like, comprising in combination with a plurality of endless conveyors at the loading end of the bottle washing machine, a support for a case of bottles, means for raising said support with the case of bottles thereon, a horizontally movable frame spaced above the support, spaced pairs of normally depending rotatable fingers in the frame means for rotating the fingers upwardly for engaging the bottles while the case is in the raised position, means for lowering the case, means for horizontally moving the frame to position the bottles above the endless conveyors and means for rotating the fingers downwardly for releasing the bottles from the frame and depositing them upon the endless conveyors, and means operated by the movement of the frame to said position for returning the frame to the initial position.

5. Bottle handling apparatus for removing bottles from cases and depositing them in a bottle washing machine or the like, comprising in combination with a plurality of endless conveyors at the loading end of the bottle washing machine, a support for a case of bottles, means for raising said support with the case of bottles thereon, a horizontally movable frame spaced above the support, spaced pairs of normally depending rotatable fingers in the frame, means for rotating the fingers upwardly to horizontal position into engagement with the necks of the bottles while the case is in raised position, means for lowering the case, means for horizontally moving the frame to position the bottles above the endless conveyors and means for tripping the fingers to release the bottles and deposit them upon the endless conveyors.

6. Bottle handling apparatus for removing bottles from cases and depositing them in a bottle washing machine or the like, comprising in combination with a plurality of endless conveyors at the loading end of the bottle washing machine, a support for a case of bottles, means for raising said support with the case of bottles thereon, a horizontally movable frame spaced above the support, spaced pairs of normally depending rotatable fingers in the frame, means for rotating said fingers to horizontal position into engagement with the bottles while the case is in raised position, means for lowering the case, means for horizontally moving the frame to position the bottles above the endless conveyors and means for tripping the fingers to release the bottles and deposit them upon the endless conveyors, and means for moving the frame back to the initial position.

7. Bottle handling apparatus for removing bottles from cases and depositing them in a bottle washing machine or the like, comprising in combination with a plurality of endless conveyors at the loading end of the bottle washing machine, a support for a case of bottles, means for raising said support with the case of bottles thereon, a horizontally movable frame spaced above the support, spaced pairs of normally depending rotatable fingers in the frame, means for rotating said fingers to horizontal position into engagement with the necks of the bottles while the case is in raised position, means for lowering the case, means for horizontally moving the frame to position the bottles above the endless conveyors and means for tripping the fingers to release the bottles and deposit them upon the endless conveyors, and means operated by the movement of the frame to said position for returning the frame to the initial position.

8. Bottle handling apparatus for removing bottles from cases and depositing them in a bottle washing machine and the like, comprising in combination with a plurality of endless conveyors at the loading end of the bottle washing machine, a vertically movable support for a case of bottles, means for raising said support with the case of bottles thereon, a horizontally movable frame spaced above the support, a plurality of rotatable shafts in the frame, spaced pairs of hook fingers upon said shafts, means for rotating said shafts to raise each pair of hook fingers into supporting engagement with one of the bottles in the case, means for lowering the case, means for moving the frame horizontally to position the bottles above the endless conveyors and means for rotating the shafts to lower the hooks to release the bottles and deposit them upon the endless conveyors.

9. Bottle handling apparatus for removing bottles from cases and depositing them in a bottle washing machine and the like, comprising in combination with a plurality of endless conveyors at the loading end of the bottle washing machine, a vertically movable support for a case of bottles, means for raising said support with the case of bottles thereon, a horizontally movable frame spaced above the support, a plurality of rotatable shafts in the frame, spaced pairs of hook fingers upon said shafts, means for rotating said shafts to raise each pair of hook fingers into supporting engagement with one of the bottles in the case, means for lowering the case, means for moving the frame horizontally to position the bottles above the endless conveyors and means operated by the movement of the frame to this position for rotating the shafts to lower the hooks to release the bottles and deposit them upon the endless conveyors.

10. Bottle handling apparatus for removing bottles from cases and depositing them in a bottle washing machine and the like, comprising in combination with a plurality of endless conveyors at the loading end of the bottle washing machine, a vertically movable support for a case of bottles, means for raising said support with the case of bottles thereon, a horizontally movable frame spaced above the support, a plurality of rotatable shafts in the frame, spaced pairs of hook fingers upon said shafts, means for rotating said shafts to raise each pair of hook fingers into supporting engagement with one of the bottles in the case, means for lowering the case, means for moving the frame horizontally to position the bottles above the endless conveyors and means for rotating the shafts to lower the hooks to release the bottles and deposit them upon the endless conveyors, and means for returning the frame to the initial position.

11. Bottle handling apparatus for removing bottles from cases and depositing them in a bottle washing machine and the like, comprising in combination with a plurality of endless conveyors at the loading end of the bottle washing machine, a vertically movable support for a case of bottles, means for raising said support with the case of bottles thereon, a horizontally movable frame spaced above the support, a plurality of rotatable shafts in the frame, spaced pairs of hook fingers upon said shafts, means for rotating said shafts to raise each pair of hook fingers into supporting engagement with one of the bottles in the case, means for lowering the case, means for moving the frame horizontally to position the bottles above the endless conveyors and means for rotating the shafts to lower the hooks to release the bottles and deposit them upon the endless conveyors, and means operated by the movement of the frame to this position for returning the frame to the initial position.

12. Bottle handling apparatus for removing bottles from cases and depositing them in a bottle washing machine and the like, comprising in combination with a plurality of endless conveyors at the loading end of the bottle washing machine, a vertically movable support for a case of bottles, means for raising said support with the case of bottles thereon, a horizontally movable frame spaced above the support, a plurality of rotatable shafts in the frame, spaced pairs of hook fingers upon said shafts, means for rotating said shafts to raise each pair of hook fingers into supporting engagement with one of the bottles in the case, means for lowering the case, means for moving the frame horizontally to position the bottles above the endless conveyors and means operated by the movement of the frame to this position for rotating the shafts to lower the hooks to release the bottles and deposit them upon the endless conveyors, and means for returning the frame to the initial position.

13. Bottle handling apparatus for removing bottles from cases and depositing them in a bottle washing machine and the like, comprising in combination with a plurality of endless conveyors at the loading end of the bottle washing machine, a vertically movable support for a case of bottles, means for raising said support with the case of bottles thereon, a horizontally movable frame spaced above the support, a plurality of rotatable shafts in the frame, spaced pairs of hook fingers upon said shafts, means for rotating said shafts to raise each pair of hook fingers into supporting engagement with one of the bottles in the case, means for lowering the case, means for moving the frame horizontally to position the bottles above the endless conveyors and means operated by the movement of the frame to this position for rotating the shafts to lower the hooks to release the bottles and deposit them upon the endless conveyors, and means operated by the movement of the frame to this position for returning the frame to the initial position.

RUSSELL F. HAMMEN.

REFERENCES CITED

The following references are of record in the file of this patent:

UNITED STATES PATENTS

| Number | Name | Date |
|---|---|---|
| 2,119,725 | Stecher | June 7, 1938 |
| 2,335,613 | Sayen | Nov. 30, 1943 |
| 2,371,128 | Costa | Mar. 13, 1945 |